(12) United States Patent
Hsieh

(10) Patent No.: US 8,014,073 B1
(45) Date of Patent: Sep. 6, 2011

(54) THIN FILM COATED OPTICAL HYBRID

(75) Inventor: Yung-Chieh Hsieh, San Jose, CA (US)

(73) Assignee: Optoplex Corporation, Fremont, CA (US)

( * ) Notice: Subject to any disclaimer, the term of this patent is extended or adjusted under 35 U.S.C. 154(b) by 0 days.

(21) Appl. No.: 12/539,560

(22) Filed: Aug. 11, 2009

Related U.S. Application Data

(63) Continuation-in-part of application No. 11/729,004, filed on Mar. 27, 2007, now Pat. No. 7,573,641.

(60) Provisional application No. 60/786,630, filed on Mar. 27, 2006, provisional application No. 60/899,579, filed on Feb. 27, 2007.

(51) Int. Cl.
*G02B 27/10* (2006.01)
*G02B 27/12* (2006.01)
*G02B 1/10* (2006.01)
*H04B 1/00* (2006.01)

(52) U.S. Cl. ......... 359/637; 359/640; 359/658; 398/115

(58) Field of Classification Search .................. 356/450; 359/583, 629, 634, 637, 638, 639, 640; 398/115, 398/116, 152, 204, 205
See application file for complete search history.

(56) References Cited

U.S. PATENT DOCUMENTS
7,864,433 B1 * 1/2011 Hsieh ............................ 359/637
* cited by examiner

*Primary Examiner* — David N Spector
(74) *Attorney, Agent, or Firm* — John P. Wooldridge

(57) ABSTRACT

An absorptive coating is in contact with an optical beam splitter such that a signal beam and a reference beam incident on the beam splitter from opposite sides are can be combined to produce two interference beams having a phase difference of about $$\frac{\pi}{2}.$$

21 Claims, 3 Drawing Sheets

THIN FILM COATED OPTICAL HYBRID

This is a continuation-in-part of U.S. patent application Ser. No. 11/729,004, which has issued as U.S. Pat. No. 7,573,641, titled "Free-Space Optical Hybrid" filed Mar. 27, 2007 now U.S. Pat. No. 7,573,641, incorporated herein by reference. U.S. patent application Ser. No. 11/729,004 claims priority to Provisional Patent Application Ser. No. 60/786,630, titled "Free-Space Optical Hybrid" filed Mar. 27, 2006, incorporated herein by reference. U.S. patent application Ser. No. 11/729,004 claims priority to Provisional Patent Application Ser. No. 60/899,579, titled "Thin Film Coated Optical Hybrid" filed Feb. 2, 2007, incorporated herein by reference.

BACKGROUND OF THE INVENTION

1. Field of the Invention

The present invention relates to coherent detection, and more specifically, it relates to embodiments of the optical hybrid for use in coherent detection.

2. Description of Related Art

The optical hybrid is a device that is used for coherent signal demodulation for either homodyne or heterodyne detection. A 90° optical hybrid is a six-port device that mixes the incoming signal with the four quadratural states associated with the reference signal in the complex-field space. The optical hybrid would then deliver the four light signals to two pairs of balanced detectors.

The existing technologies for making optical hybrids are the waveguide approach, fiber coupler technology and micro-optics technology. The waveguide and the fiber approach require temperature control to hold the relative phase shift among the output ports. In addition to that, the cost is high. The micro-optics approach can make the device passive; however, the manufacturing process is more complex; it is therefore suitable only for high-end applications.

SUMMARY OF THE INVENTION

It is an object of the present invention to provide a thin film coated optical hybrid.

Another object is to provide a method for using a thin film coated optical hybrid for coherent detection.

These and other objects will be apparent based on the disclosure herein.

The optical hybrid is a key component for coherent detection. The two inputs of this device are the signal light and local oscillator (reference light). The outputs consist of the interferences between the two inputs with various phase shifts between them. FIG. 1 is a schematic of a dual-output optical hybrid according to the present invention. A signal beam 10 and a local oscillator beam 12 are input to the dual output hybrid 14 which outputs one beam 16 having a phase of S+L and another beam 18 having a phase of S+jL. FIG. 2 is a schematic showing the combined phases in the output beams of an optical hybrid. A signal beam 20 and a local oscillator beam 22 are input to a quadruple output hybrid 24 which outputs four beams, 25-28 having combined phases of S+L, S−L, S+jL and S−jL, respectively. This invention provides embodiments of cost-effective, passive optical hybrids based on thin-film coating technology.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Figure 1:
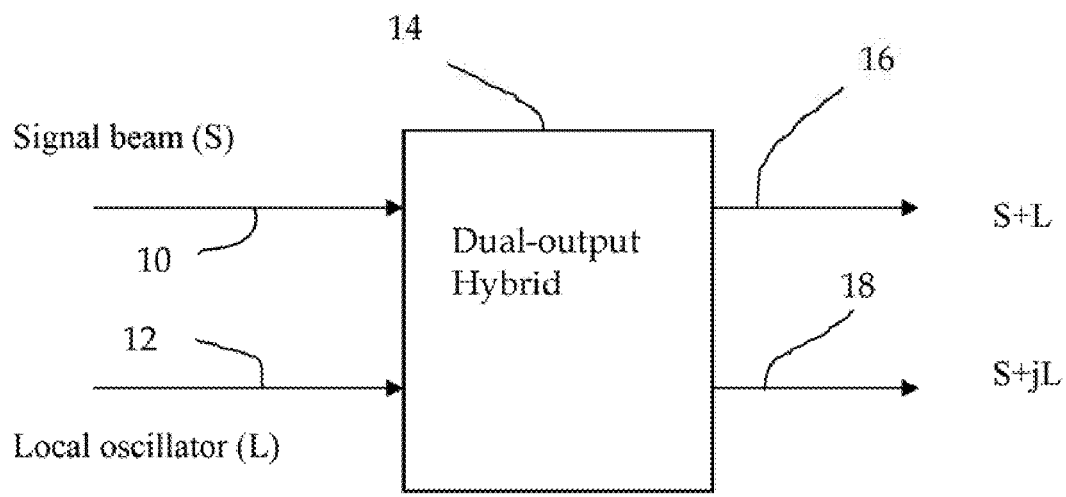
FIG. 1 is a schematic of a dual-output optical hybrid.
Figure 2:
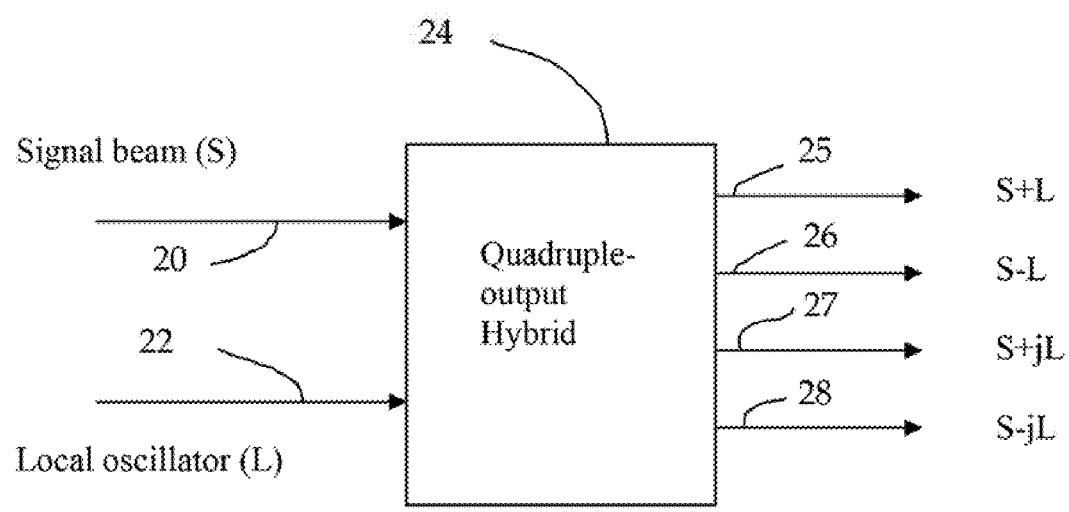
FIG. 2 is a schematic showing the combined phases in the output beams of an optical hybrid.
Figure 3:
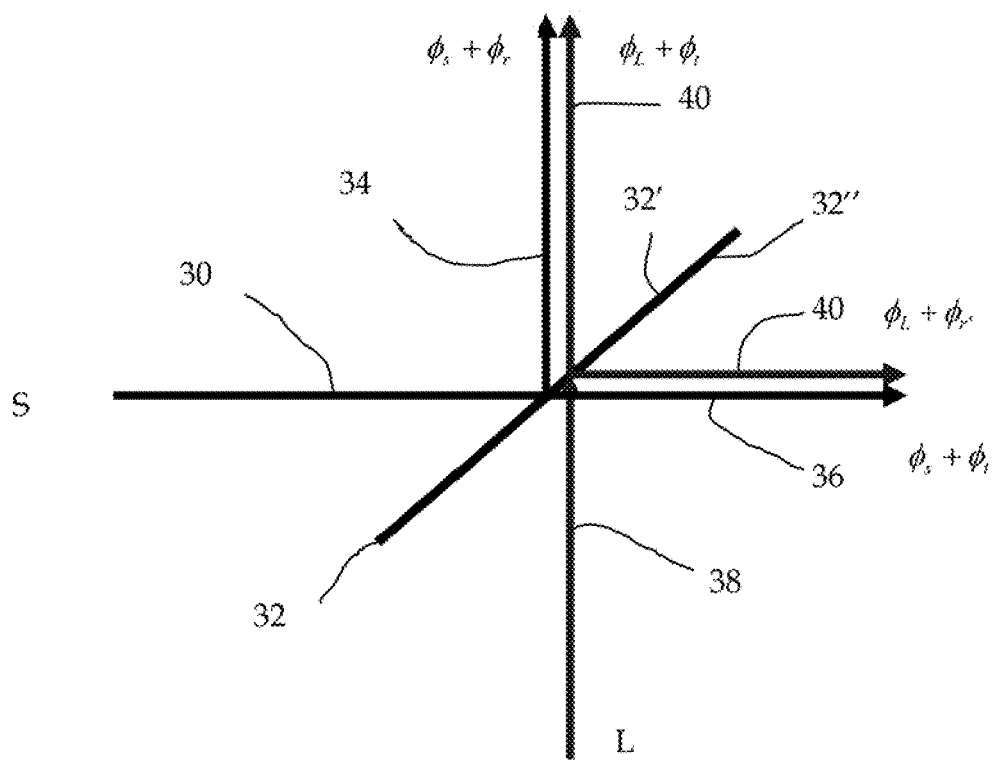
FIG. 3 shows the various phases of reflection and transmission beams of the signal beam and local oscillator beams resulting from reflection by and transmission through a beam splitter.

This invention provides a low-cost solution for making a dual output optical hybrid. FIG. 3 shows the phases of the reflected and transmitted signal and local oscillator beams. Signal beam 30 is reflected by beam splitter 32 to produce a beam 34 having a phase of $\phi_s+\phi_r$. Signal beam 30 is transmitted through beam splitter 32 to produce a beam 36 having a phase of $\phi_s+\phi_t$. A local oscillator (or reference) beam 38 is transmitted through beam splitter 30 to produce a beam 44 having a phase of $\phi_L+\phi_t$. Local oscillator (or reference) beam 38 is reflected by beam splitter 32 to produce a beam 46 having a phase of $\phi_L+\phi_{r'}$.

Figure 4:
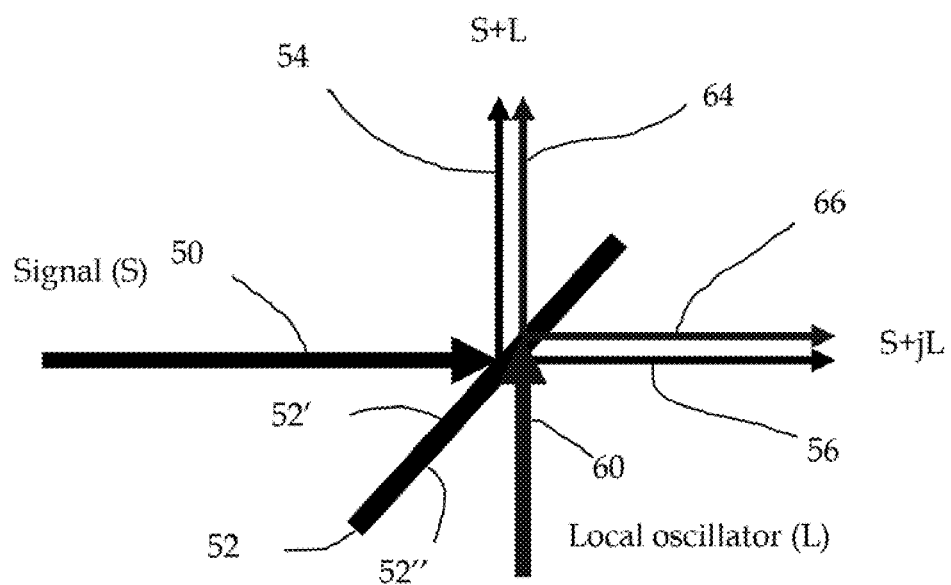
FIG. 4 illustrates a 45-degree incident angle with a signal beam and a local oscillator beam to make a two output port 90-dgree hybrid.

FIG. 4 is a schematic showing the combined phases in the output beams of an optical hybrid using a beam splitter. Signal beam 50 is reflected by beam splitter 52 to produce a beam 54. Signal beam 50 is transmitted through beam splitter 52 to produce a beam 56. Local oscillator (or reference) beam 60 is transmitted through beam splitter 52 to produce a beam 64. Local oscillator (or reference) beam 60 is reflected by beam splitter 52 to produce a beam 66. The interference of beams 54 and 64 produces an output having a phase of S+L. The interference of beams 56 and 66 produces an output having a phase of S+jL. Thus, the phase difference between the two interference beams on the top of the beam splitter of FIGS. 3 and 4 is:

$$\delta\phi_1 = (\phi_s+\phi_r)-(\phi_L+\phi_t) \qquad \text{Equation 1}$$

$$\delta\phi_2 = (\phi_s+\phi_t)-(\phi_L+\phi_{r'}), \qquad \text{Equation 2}$$

where $\phi_r$ is the phase change of the reflection beam for light reflected from the front surface of each beam splitter, $\phi_{r'}$ is the phase change of the light reflected from the back surface of each beam splitter and $\phi_t$ is the phase change of the transmission beam for light transmitted from either the front or the back surface of each beam splitter. To make these beamsplitters 32, 52, of FIGS. 3 and 4 respectively, operate as 90-degree optical hybrids, it is required that:

$$\Delta\varphi = \delta\varphi_1 - \delta\varphi_2 = \pm\frac{\pi}{2}. \qquad \text{Equation 3A}$$

By substituting equations 1 and 2 into Equation 3A, we obtain the following Equation 3B.

$$\varphi r + \varphi r'_- - 2\varphi_t = \pm \frac{\pi}{2}.$$ Equation 3B

The phase matching conditions in equations 3A and 3B are necessary and sufficient for making a dual-output 90-dgree optical hybrid.

If all the coating material used in making the beam splitter is non-absorptive, the phase matching condition shown in Eq. (3) cannot be satisfied. Instead, the phase relationship is as follows:

$$\phi_r + \phi_{r'} - 2\phi_t = \pi$$ Equation (4)

Equation (4) is a result of energy conservation. When the coating material is a non-absorption type of material, the optical energy will either go to the right hand side of the example beam splitters or to the top side of the example beam splitters. Therefore, the phase difference of the two interference beams (S and L) on the top is always 180 degree different from that in the right hand side. In other words, to reach the phase match condition shown in Eq. (3), there should be absorptive material in at least one coating layer on the beam splitter. Accordingly, an absorptive coating, as discussed herein, is made to be in contact with at least one of the sides 32' or 32" of beam splitter 32 of FIG. 3. In like manner, an absorptive coating is made to be in contact with at least one of the sides 52' or 52" of beam splitter 52 of FIG. 4. In each of FIGS. 3 and 4, S+L and S+jL have a relative phase difference determined by the degree of absorption of the coating. Further, the relative phase difference between S+L and S+jL can be determined by the degree of absorption of the coating in conjunction with the angle of incidence of the signal and reference beams.

Figure 5:
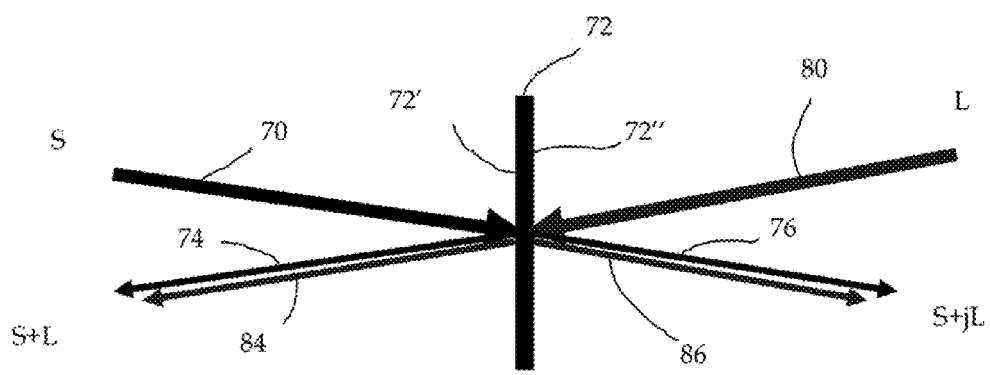
FIG. 5 shows a near normal incident two output port 90-dgree hybrid (using dual fiber collimators in both left hand side and right hand side of the beam splitter).

FIG. 5 shows a near normal incident two output port 90-dgree hybrid. This embodiment can use dual fiber collimators in both the left hand side and right hand side of the beam splitter. An input signal beam 70 is reflected by beam splitter 72 to produce a beam 74. Input signal beam 70 is transmitted by beam splitter 72 to produce a beam 76. Reference beam 80 is transmitted by beam splitter 72 to produce a beam 84. Reference beam 80 is reflected by beam splitter 72 to produce a beam 86. Beams 74 and 84 interfere to produce a phase relationship of S+L. Beams 76 and 86 interfere to produce a phase relationship of S+jL. To produce the phase matching condition of Equation (3), an absorptive coating 72' or 72", as discussed herein, contacts beam splitter 72. S+L and S+jL have a relative phase difference determined by the degree of absorption of coating. Further, the relative phase difference between S+L and S+jL can be determined by the degree of absorption of the coating in conjunction with the angle of incidence of the signal and reference beams.

Figure 6:
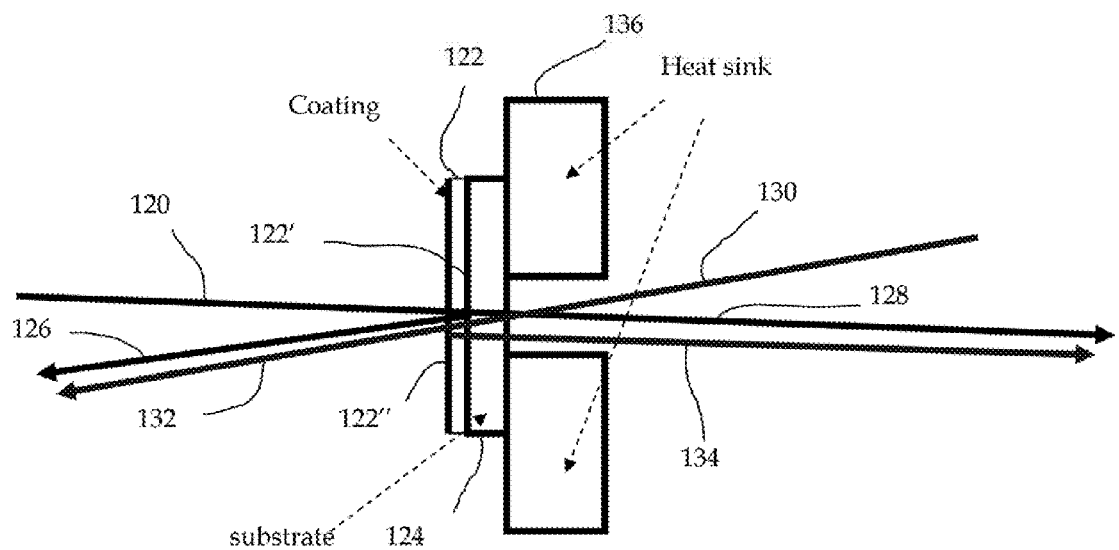
FIG. 6 shows a beam splitter attached to a heat sink to dissipate the heat generated by the absorbed optical power.

FIG. 6 shows a beam splitter attached to a heat sink to dissipate the heat generated by the absorbed optical power. A signal beam 120 passes through an absorptive coating 122 and is reflected at the interface 122' (or surface of coating 122 adjacent to substrate 124) between the coating 122 and a substrate 124 to produce beam 126. Beam 120 passes through substrate 124 to produce beam 128. A reference beam 130 passes through substrate 124 and through coating 122 to produce a beam 132. Reference beam 130 is reflected at surface or interface 122" of coating 122 to produce a beam 134. A heat sink 136 is attached to substrate 124. Beams 126 and 132 interfere to produce a phase relationship of S+L. Beams 128 and 134 interfere to produce a phase relationship of S+jL. S+L and S+jL have a relative phase difference determined by the degree of absorption of coating 122. Further, the relative phase difference between S+L and S+jL can be determined by the degree of absorption of the coating in conjunction with the angle of incidence of the signal and reference beams.

An example thin film optical hybrid is a layered structure as follows: substrate/Ni/3.0276 L/H/0.7327H/1.3685L/1.6855H/substrate, wherein the substrate is Fused Silica, the Ni has a thickness of 14 nm, material H is Ta2O5 and material L is SiO2. The incident angle is: 45 degrees. The working wavelength range is 1525 nm to 1565 nm. The coating layer is sandwiched by the two fused silica substrates. The thickness of 1 H is a quarter wave of the optical thickness of the material H. The thickness of 1 L is a quarter wave of the optical thickness of the material L.

Accordingly, an optical beam splitter is used to make an optical hybrid. The phase shift can be any angle (not limited to 90 degree). The coating should satisfy the phase matching condition of Equation 3 (the phase is not limited to 90 degrees). At least one of the coating layers should be absorptive. The incident angle of the beam splitter can be any arbitrary angle (not limited to 0 or 45 degrees). Since the device absorbs a certain percentage of the optical power, there is heat generation during the operation. A heat sink may be required to attach to the beam splitter. A preferred coating substrate is silicon or other material that has a high thermal conductivity. To make the dual-output hybrid compact, a near normal incident beam splitter is preferred. In this configuration, two dual-fiber collimators can be used to deliver the light to into and out of the device.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:

1. An optical hybrid, comprising:
   an optical beam splitter (BS) for combining a signal beam and a reference beam incident on said BS from opposite sides to produce a first interference beam and a second interference beam, wherein said first interference beam comprises a reflected portion of said signal beam and a transmitted portion of said reference beam, and wherein said second interference beam comprises a transmitted portion of said signal beam and a reflected portion of said reference beam; and
   a coating in contact with said BS to satisfy a phase matching condition, said coating comprising a material that absorbs a portion of said reference beam and a portion of said signal beam, wherein said phase matching condition is $\phi_r + \phi_{r'} - 2\phi_t = \pm$ $$\frac{\pi}{2},$$

where $\phi_r$ is the phase change of said reflected portion of said signal beam, where $\phi_{r'}$ is the phase change of said reflected portion of said reference beam and where $\phi_t$ is phase change of said transmitted portion of said reference beam.

2. The optical hybrid of claim 1, wherein said phase matching condition is $\Delta\phi = \delta\phi_1 - \delta\phi_2 = \pm$ $$\frac{\pi}{2},$$

where $\delta\phi_1$ is the phase of said first interference beam and where $\delta\phi_2$ is the phase of said second interference beam.

3. The optical hybrid of claim 1, wherein said coating is a multi-layered coating.

4. The optical hybrid of claim 1, further comprising means for cooling said beam splitter.

5. The optical hybrid of claim 1, wherein said means for cooling comprises a heat sink.

6. The optical hybrid of claim 1, wherein said coating comprises a material having a thermal conductivity of at least 1 W/cmK.

7. The optical hybrid of claim 1, wherein said coating comprises silicon.

8. The optical hybrid of claim 1, wherein said phase difference is determined by the amount of absorption by said coating of said signal beam and said reference beam.

9. The optical hybrid of claim 1, wherein said phase difference is determined by the angle of incidence of said signal beam and said reference beam onto said beam splitter, and wherein said phase difference is further determined by the amount of absorption by said coating of said signal beam and said reference beam.

10. A method, comprising combining a signal beam and a reference beam incident on said a beam splitter (BS) from opposite sides to produce a first interference beam and a second interference beam, wherein said first interference beam comprises a reflected portion of said signal beam and a transmitted portion of said reference beam, and wherein said second interference beam comprises a transmitted portion of said signal beam and a reflected portion of said reference beam, wherein a coating is in contact with said BS to satisfy a phase matching condition, said coating comprising a material that absorbs a portion of said reference beam and a portion of said signal beam, wherein said phase matching condition is $\phi_r + \phi_{r'} - 2\phi_t = \pm$ $$\frac{\pi}{2},$$

where $\phi_r$ is the phase change of said reflected portion of said signal beam, where $\phi_{r'}$ is the phase change of said reflected portion of said reference beam and where $\phi_t$ is phase change of said transmitted portion of said reference beam.

11. The method of claim 10, wherein said phase matching condition is $\Delta\phi = \delta\phi_1 - \delta\phi_2 = \pm$ $$\frac{\pi}{2},$$

where $\delta\phi_1$ is the phase of said first interference beam and where $\delta\phi_2$ is the phase of said second interference beam.

12. The method of claim 10, wherein said coating is a multi-layered coating.

13. The method of claim 10, further comprising cooling said beam splitter.

14. The method of claim 10, further comprising cooling said beam splitter with a heat sink.

15. The method of claim 10, wherein said coating comprises a material having a thermal conductivity of at least 1 W/cmK.

16. The method of claim 10, wherein said coating comprises silicon.

17. The method of claim 10, wherein said phase difference is determined by the amount of absorption by said coating of said signal beam and said reference beam.

18. The method of claim 10, wherein said phase difference is determined by the angle of incidence of said signal beam and said reference beam onto said beam splitter, and wherein said phase difference is further determined by the amount of absorption by said coating of said signal beam and said reference beam.

19. A method for making an optical hybrid, comprising:
providing an optical beam splitter (BS) for combining a signal beam and a reference beam incident on said BS from opposite sides to produce a first interference beam and a second interference beam, wherein said first interference beam comprises a reflected portion of said signal beam and a transmitted portion of said reference beam, and wherein said second interference beam comprises a transmitted portion of said signal beam and a reflected portion of said reference beam; and
contacting a coating with said BS to satisfy a phase matching condition, said coating comprising a material that absorbs a portion of said reference beam and a portion of said signal beam, wherein said phase matching condition is $\phi_r + \phi_{r'} - 2\phi_t = \pm$ $$\frac{\pi}{2},$$

where $\phi_r$ is the phase change of said reflected portion of said signal beam, where $\phi_{r'}$ is the phase change of said reflected portion of said reference beam and where $\phi_t$ is phase change of said transmitted portion of said reference beam.

20. The method of claim 19, wherein said phase matching condition is $\Delta\phi = \delta\phi_1 - \delta\phi_2 = \pm$ $$\frac{\pi}{2},$$

where $\delta\phi_1$ is the phase of said first interference beam and where $\delta\phi_2$ is the phase of said second interference beam.

21. The method of claim 19, wherein said phase difference is determined by a factor selected from the group consisting of (i) the angle of incidence of said signal beam and said reference beam onto said beam splitter, and (ii) the amount of absorption by said coating of said signal beam and said reference beam.

* * * * *